(12) United States Patent
Hirose

(10) Patent No.: US 9,498,828 B2
(45) Date of Patent: Nov. 22, 2016

(54) CUTTING TOOL

(71) Applicant: SUMITOMO ELECTRIC HARDMETAL CORP., Itami-shi, Hyogo (JP)

(72) Inventor: Kazuhiro Hirose, Itami (JP)

(73) Assignee: SUMITOMO ELECTRIC HARDMETAL CORP., Hyogo (JP)

( * ) Notice: Subject to any disclaimer, the term of this patent is extended or adjusted under 35 U.S.C. 154(b) by 187 days.

(21) Appl. No.: 14/382,722

(22) PCT Filed: Feb. 15, 2013

(86) PCT No.: PCT/JP2013/053623
§ 371 (c)(1),
(2) Date: Sep. 3, 2014

(87) PCT Pub. No.: WO2013/136905
PCT Pub. Date: Sep. 19, 2013

(65) Prior Publication Data
US 2015/0023745 A1    Jan. 22, 2015

(30) Foreign Application Priority Data

Mar. 14, 2012 (JP) ................. 2012-057250

(51) Int. Cl.
B23B 27/14    (2006.01)
B23C 5/20    (2006.01)
C22C 29/02    (2006.01)
B22F 5/00    (2006.01)

(52) U.S. Cl.
CPC ............. *B23B 27/148* (2013.01); *B23C 5/20* (2013.01); *C22C 29/02* (2013.01); *B22F 2005/001* (2013.01); *B23B 2222/16* (2013.01); *B23B 2222/88* (2013.01); *B23B 2224/04* (2013.01); *B23C 2222/16* (2013.01); *B23C 2222/88* (2013.01); *Y10T 407/27* (2015.01)

(58) Field of Classification Search
CPC .......................... C22C 29/005; B23B 27/148
See application file for complete search history.

(56) References Cited

U.S. PATENT DOCUMENTS 5,053,074 A * 10/1991 Buljan .................. C22C 29/005
75/232
5,462,901 A * 10/1995 Egami ..................... C22C 29/02
501/87
5,945,167 A * 8/1999 Kuwabara ............... C22C 1/051
427/226
2009/0092453 A1    4/2009 Jonsson
2011/0002749 A1    1/2011 Ljungberg et al.
2011/0064530 A1    3/2011 Ban et al.

FOREIGN PATENT DOCUMENTS

| CN | 1636657 A | 7/2005 |
|---|---|---|
| CN | 1660531 A | 8/2005 |
| CN | 1974205 A | 6/2007 |
| CN | 101790594 A | 7/2010 |
| CN | 102143814 A | 8/2011 |
| CN | 102596456 A | 7/2012 |
| JP | A-06-172910 | 6/1994 |
| JP | A-08-174034 | 7/1996 |
| JP | A-09-241826 | 9/1997 |
| JP | A-2002-536194 | 10/2002 |
| JP | A-2007-007780 | 1/2007 |
| JP | A-2010-194669 | 9/2010 |
| WO | 2009017053 A1 | 2/2009 |
| WO | 2010/035824 A1 | 4/2010 |
| WO | 2011/052767 A1 | 5/2011 |

OTHER PUBLICATIONS

Aug. 11, 2015 Office Action issued in Chinese Patent Application No. 2013800123787.
Apr. 13, 2016 Office Action issued in Taiwanese Patent Application No. 102106786.
Jun. 26, 2015 extended Search Report issued in European Patent Application No. 13760578.8.
International Search Report issued in International Application No. PCT/JP2013/053623 dated May 14, 2013.

* cited by examiner

*Primary Examiner* — Will Fridie, Jr.
(74) *Attorney, Agent, or Firm* — Oliff PLC

(57) ABSTRACT

A cutting tool includes a substrate composed of a cermet. The cermet includes a hard phase including compounds containing Ti, at least one metal other than Ti selected from groups 4, 5, and 6 of the periodic table, and at least one element of carbon and nitrogen, a binder phase including, as a main component, an iron group metal, and unavoidable impurities. At least one type of particles selected from alumina particles and zirconia particles with an average particle size of 0.5 μm or more and 5 μm or less is scattered over a surface of a rake face of the substrate, and the concentration of at least one element of aluminum and zirconium in the surface is 0.5 at % or more and 5 at % or less.

5 Claims, No Drawings

CUTTING TOOL

TECHNICAL FIELD

The present invention relates to a cutting tool including a substrate composed of a cermet. More particularly, the present invention relates to a cutting tool which has excellent welding resistance and fracture resistance and which can exhibit stable cutting performance over long-term use.

BACKGROUND ART

Sintered metals (e.g., cermets and cemented carbides) in which hard particles (hard phases) of carbides, carbonitrides, or the like are bonded with an iron group metal (binder phase), such as cobalt (Co) or nickel (Ni), have been used as substrates for cutting tools. In general, in a cermet, the main hard phase is composed of particles of a Ti compound, such as titanium carbide (TiC) or titanium carbonitride (TiCN). On the other hand, in a cemented carbide, the main hard phase is composed of tungsten carbide (WC) particles. Cutting tools including substrates composed of a cermet have the following advantages over cutting tools including substrates composed of a cemented carbide:
(1) excellent wear resistance,
(2) high surface quality in steel machining,
(3) capability of high-speed cutting,
(4) lightweight, and
(5) abundance and inexpensiveness of raw materials.

Techniques for performing a blast treatment on the surface of a substrate of a cutting tool composed of a sintered metal, thereby improving surface properties are described, for example, in Patent Literatures 1 to 4.

Patent Literatures 1 to 3 describe that, before a substrate of a drill or indexable insert is subjected to a coating treatment, by performing a blast treatment on the surface of the substrate, unwanted substances on the surface of the substrate are removed, thereby improving adhesion with the coating layer. Patent Literature 4 describes that, by performing a blast treatment on the surface of a rake face of an insert substrate composed of a cermet, ceramic particles, such as alumina particles, used as abrasive grains are embedded and scattered in the surface of the rake face so that welding resistance can be improved.

CITATION LIST

Patent Literature

PTL 1: Japanese Unexamined Patent Application Publication (Translation of PCT Application) No. 2002-536194
PTL 2: Japanese Unexamined Patent Application Publication No. 2007-007780
PTL 3: Japanese Unexamined Patent Application Publication No. 9-241826
PTL 4: Japanese Unexamined Patent Application Publication No. 2010-194669

SUMMARY OF INVENTION

Technical Problem

In the techniques described in Patent Literatures 1 to 3, adhesion of coating is improved by cleaning the surface of the substrate by the blast treatment. Although the effect of cleaning the surface of the substrate can be obtained under the blast treatment conditions described in these literatures, no further effect can be anticipated.

On the other hand, in the technique described in Patent Literature 4, by embedding and scattering ceramic particles with an average particle size of 5 to 100 μm in the surface of the rake face of the substrate by the blast treatment, the surface state is modified. However, since ceramic particles that are coarser than hard particles constituting the hard phase of the substrate are scattered, chipping is likely to occur, originating from the coarse particles, which may possibly cause fracturing or the like.

The present invention has been achieved under these circumstances, and it is an object of the invention to provide a cutting tool which has excellent welding resistance and fracture resistance and which can exhibit stable cutting performance over long-term use.

Solution to Problem

A cutting tool of the present invention includes a substrate composed of a cermet. The cermet includes a hard phase including compounds containing Ti, at least one metal other than Ti selected from groups 4, 5, and 6 of the periodic table, and at least one element of carbon and nitrogen, a binder phase including, as a main component, an iron group metal, and unavoidable impurities. The cutting tool is characterized in that at least one type of particles selected from alumina particles and zirconia particles with an average particle size of 0.5 μm or more and 5 μm or less is scattered over a surface of a rake face of the substrate, and the concentration of at least one element of aluminum and zirconium in the surface is 0.5 at % or more and 5 at % or less.

In the cutting tool of the present invention, alumina particles or zirconia particles (hereinafter, may be simply referred to as "alumina particles or the like") with a predetermined average particle size are scattered over the surface of the rake face of the substrate, and the concentration of aluminum or zirconium (hereinafter, may be simply referred to as "aluminum or the like") constituting the particles is in a predetermined range. Since a surface state in which such fine alumina particles or the like are scattered is formed, it is possible to suppress occurrence of welding on the rake face with which a workpiece (including chips) is brought into contact during cutting, and chipping and fracturing of the tool can be prevented. Therefore, the cutting performance of the cutting tool can be prevented from being degraded, and stable cutting performance can be exhibited over long-term use.

In the present invention, in the case where alumina particles or the like are scattered over a portion with which a workpiece is brought into contact during cutting, other than the rake face, such as a flank face, as in the rake face, welding on the tool can be further suppressed. However, in the case where alumina particles or the like are scattered over the surface of an edge (cutting edge), there is a concern that the surface quality of the workpiece may be adversely affected. Therefore, it is preferable to perform an edge treatment, such as a honing treatment. On the other hand, in a portion which is not involved with cutting, such as a seating surface to be fixed on a holder, or a vicinity of a mounting hole, since it is not necessary to suppress welding, alumina particles or the like may not be scattered over the surface thereof. That is, in portions related to cutting performance, other than the edge, alumina particles or the like are preferably scattered.

When the average particle size of alumina particles or the like is less than 0.5 μm, the effect on welding resistance is unlikely to be obtained, and chipping and fracturing due to welding are likely to occur. On the other hand, when the average particle size is more than 5 μm, the particles may serve as starting points for chipping, and fracturing is likely to occur during cutting. Furthermore, when the average particle size is more than 5 μm, the particles may damage the substrate, resulting in decrease in strength and degradation in wear resistance. The average particle size is preferably 1 μm or more and 4 μm or less.

The element, such as aluminum, derives from the constituent of alumina particles or the like. When the elemental concentration of aluminum or the like is less than 0.5 at %, the effect on welding resistance is unlikely to be obtained, and chipping and fracturing due to welding are likely to occur. On the other hand, when the elemental concentration is more than 5 at %, although sufficient welding resistance can be obtained, wear resistance tends to degrade due to the large amount of the constituent. Preferably, the elemental concentration is 1 at % or more and 2.5 at % or less.

The average particle size of alumina particles or the like and the elemental concentration of aluminum or the like in the surface of the substrate (rake face) are obtained by the following methods. First, an area of 150 μm×150 μm in the surface of the substrate is observed with a scanning electron microscope (SEM), quantitative analysis by energy dispersive X-ray analysis (EDX) is performed in the area, and the resulting value is defined as the elemental concentration. The longest diameter is measured for each of all alumina particles detected by EDX in the area, and the average value thereof is defined as the average particle size.

Furthermore, in the cutting tool of the present invention, preferably, the average hardness in a region from the sintered surface of the surface of the substrate to a depth of 50 μm is 10% or more higher than the average hardness in a region in the depth range of 150 to 200 μm.

In the case where the hardness of the surface portion is higher than that of the interior portion in the cermet substrate, wear resistance improves, whereas toughness tends to decrease. Consequently, when the cutting quality is degraded by welding of a workpiece on the rake face and the cutting force is increased, there is a possibility that fracturing will be caused. In the present invention, occurrence of welding on the rake face can be suppressed, and according to the structure described above, the effects of the present invention can be effectively achieved.

The term "sintered surface" refers to a surface as sintered.

The cutting tool of the present invention can be basically produced by the steps of preparing starting material powders, mixing and forming, sintering, and performing a blast treatment.

In the step of preparing starting material powders, powders of compounds containing Ti, at least one metal other than Ti selected from groups 4, 5, and 6 of the periodic table, and at least one element of carbon and nitrogen, and a powder of an iron group metal are prepared as starting material powders.

Examples of the compounds include carbides, nitrides, and carbonitrides of the metal described above, and solid solutions thereof. Examples of a Ti compound include TiC, TiN, and TiCN. Examples of at least one metal other than Ti selected from groups 4, 5, and 6 of the periodic table include W, Mo, Cr, V, Nb, Ta, and Zr, and examples of a compound of such a metal include WC, $Mo_2C$, $Cr_3C_2$, VC, NbC, TaC, and ZrC. Furthermore, the compounds may include a Ti compound containing Ti and at least one metal other than Ti selected from groups 4, 5, and 6 of the periodic table. Examples thereof include a carbonitride including Ti and W (TiWCN). These compounds constitute a hard phase. According to the present invention, in the cermet, the Ti compound is a main component of the hard phase (in an amount of 50% or more of the total hard phase, in percent by mass, the amount of the Ti compound being largest in the hard phase). Preferably, the amount of the hard phase is 75% to 95% by mass of the entire cermet. Furthermore, the average particle size of the powders of the compounds is preferably 0.5 to 2 μm.

Examples of the iron group metal include Co and Ni. The iron group metal constitutes a binder phase. In the present invention, the iron group metal is a main component of the binder phase (in an amount of 65% or more of the total binder phase, the amount of the iron group metal being largest in the binder phase). Furthermore, the average particle size of the powder of the iron group metal is preferably 0.3 μm or more and 4 μm or less.

In the step of mixing and forming, after the starting material powders are mixed, the resulting mixture is formed into a tool shape, and thus a compact is obtained. Mixing can be performed, for example, by a ball mill. Forming can be performed, for example, by press forming.

In the sintering step, the compact is heated and sintered, and then cooled to obtain a substrate composed of a cermet. The sintering step includes a heating step and a cooling step.

In the heating step, for example, in a vacuum of 100 Pa or less, heating (primary heating) is performed to 1,250° C. at a temperature rise rate of 5° C./min or more and 15° C./min or less. Subsequently, in a nitrogen atmosphere of 100 Pa or more and 2,000 Pa or less, heating (secondary heating) is performed to 1,450° C. or more and 1,550° C. or less, which is a sintering holding temperature, at a temperature rise rate of 1° C./min or more and 5° C./min or less, and then the sintering holding temperature is maintained for a certain period of time. The sintering holding time is, for example, 30 minutes or more and 1.5 hours or less. In the secondary heating, by heating at a low temperature rise rate of 1° C./min or more and 5° C./min or less, the cermet can be densified.

In the cooling step, cooling is performed, for example, in an Ar or CO gas atmosphere with a pressure of 500 Pa or more and 500 kPa or less. In the heating step, in particular, in the secondary heating, by heating and holding the temperature in the nitrogen atmosphere at a predetermined pressure, elimination of nitrogen from the constituents of the cermet is suppressed. Furthermore, in the cooling step, by setting a denitrifying and decarburizing condition (for example, cooling in an Ar gas atmosphere), it is possible to obtain the cermet substrate in which the hardness of the surface is higher than that of the interior portion.

In the blast treatment step, the rake face in the surface of the cermet substrate is subjected to a blast treatment using at least one type of abrasive grains selected from alumina abrasive grains and zirconia abrasive grains (hereinafter, may be simply referred to as "alumina abrasive grains or the like"). Alumina abrasive grains or the like are made to impinge on the surface of the substrate (rake face) and portions thereof are made to remain in the surface of the substrate. Thereby, fine alumina particles or the like are scattered over the surface of the substrate, thus forming a surface state in the present invention. The blast treatment may be of a wet type or a dry type. However, in wet-type blasting, the surface of the substrate can be locally subjected to the blast treatment efficiently, which is preferable.

The state of the surface of the substrate (rake face) can be changed by changing the conditions for the blast treatment. Examples of the blast treatment conditions include the average particle size of alumina abrasive grains or the like, the concentration of alumina abrasive grains or the like, the blast pressure, the blasting angle, and the blasting time. These conditions are preferably set in the following ranges: the average particle size of alumina abrasive grains or the like is 10 μm or more and 50 μm or less, the concentration of the alumina abrasive grains or the like is 5% by volume or more and 15% by volume or less, the blast pressure is 0.5 MPa or more and 2.5 MPa or less, the blasting angle (angle with respect to a direction perpendicular to the surface of the substrate (rake face)) is 15° or more and 60° or less, and the blasting time is 5 second or more and 20 seconds or less. More preferably, the concentration of the alumina abrasive grains or the like is more than 5% by volume, the blast pressure is less than 2.5 MPa, and the blasting time is 15 seconds or less. Note that in the surface state, these conditions influence one another. Therefore, even when some conditions are out of the preferable ranges described above, the surface state in the present invention may be obtained depending on other conditions in some cases. The conditions are not necessarily limited to the preferable ranges described above.

The alumina abrasive grains or the like are preferably spherical, and the sphericity thereof is preferably 1.5 or less. More preferably, the sphericity is 1.2 or less. The term "sphericity" refers to a ratio of the maximum diameter to the minimum diameter (maximum diameter/minimum diameter) in an abrasive grain. Since spherical abrasive grains are not likely to break into pieces, when they impinge on the surface of the substrate, small portions of the surfaces of the abrasive grains are chipped, and the chips remain in the surface of the substrate. Accordingly, the average particle size of alumina particles or the like in the surface of the substrate (rake face) is likely to be decreased. In contrast, in the case of polygonal abrasive grains, because of the presence of corners, the abrasive grains may be stuck into the surface of the substrate and remain as they are in some cases. Furthermore, since polygonal abrasive grains are likely to break into pieces, if the particle size thereof is large, when they impinge on the surface of the substrate or the abrasive grains impinge on one another, large broken, pointed pieces may stick into the surface of the substrate in some cases. Accordingly, the average particle size of alumina particles or the like in the surface of the substrate (rake face) is likely to be increased.

Furthermore, regarding the state of the surface of the substrate (rake face) formed by the blast treatment, as the concentration of alumina abrasive grains or the like decreases, the average particle size of alumina particles or the like remaining in the surface of the substrate tends to decrease, and the elemental concentration of aluminum or the like tends to decrease. As the concentration of alumina abrasive grains or the like increases, the average particle size of alumina particles or the like remaining in the surface of the substrate tends to increase, and the elemental concentration of aluminum or the like tends to increase. Furthermore, as the blast pressure decreases, the average particle size of alumina particles or the like remaining in the surface of the substrate tends to decrease, and the elemental concentration of aluminum or the like tends to decrease. As the blast pressure increases, the average particle size of alumina particles or the like remaining in the surface of the substrate tends to increase, and the elemental concentration of aluminum or the like tends to increase. Furthermore, as the blasting angle decreases, the average particle size of alumina particles or the like remaining in the surface of the substrate tends to increase, and the elemental concentration of aluminum or the like tends to increase. As the blasting angle increases, the average particle size of alumina particles or the like remaining in the surface of the substrate tends to decrease, and the elemental concentration of aluminum or the like tends to decrease. Furthermore, as the blasting time shortens, the elemental concentration of aluminum or the like tends to decrease. As the blasting time lengthens, the elemental concentration of aluminum or the like tends to increase.

In particular, by setting the blasting angle at 15° or more and 60° or less and by performing a wet blast treatment in an oblique direction with an angle of inclination of 15° to 60° with respect to a direction perpendicular to the surface of the substrate (rake face), the surface state in the present invention can be easily obtained. Furthermore, in the case of a substrate of an indexable insert in which the rake face and the flank face are substantially orthogonal to each other, by performing a blast treatment, from the rake face side to the flank face side, in an oblique direction inclined toward the edge side with respect to a direction perpendicular to the rake face, not only the rake race, but also the flank face can be subjected to the blast treatment. In this case, by setting the blasting angle at 45°, a blast treatment can be performed in the same manner on both the rake face and the flank face.

It is not necessary to perform a blast treatment on a portion which is not involved with cutting, such as a seating surface to be fixed on a holder, and the sintered surface may be left untreated. Thereby, reduction in production cost and production time can be achieved.

Furthermore, in the case where alumina particles or the like are scattered over the surface of an edge (cutting edge), there is a concern that the surface quality of the workpiece may be adversely affected. Therefore, in the case where the surface of the edge is subjected to the blast treatment, it is preferable to perform, separately, an edge treatment by honing the edge.

Advantageous Effects of Invention

In the cutting tool of the present invention, the surface state in which fine alumina particles or the like are scattered over the surface of the rake face is formed, and therefore, the cutting tool has excellent welding resistance and fracture resistance and can exhibit stable cutting performance over long-term use.

DESCRIPTION OF EMBODIMENTS

Test Example 1

Cutting tools of the present invention were produced, and analysis and evaluation were performed.

As starting materials, a TiCN powder having an average particle size of 1 μm, a WC powder, a TaC powder, a NbC powder, a ZrC powder, and a $Mo_2C$ powder, each having an average particle size of 0.5 to 2 μm, and a Ni powder and a Co powder, each having an average particle size of 1 μm were prepared. By compounding these powders so as to satisfy the composition shown in Table I, starting material powders were obtained. The term "average particle size" refers to the particle size (D50) corresponding to the particle size at 50% in the cumulative distribution of particles constituting the powder on the volume basis.

TABLE I

| Composition (mass %) | | | | | | | |
|---|---|---|---|---|---|---|---|
| TiCN | WC | TaC | NbC | ZrC | Mo$_2$C | Ni | Co |
| 57.5 | 15 | 2 | 10 | 0.5 | 1 | 5 | 9 |

The starting material powders were wet-mixed and pulverized with a ball mill, and then a spherical granulated powder of 50 to 100 μm was obtained using a spray dryer. Next, the granulated powder was press-formed into a shape of an ISO standard CNMG120408 insert at a forming pressure of 98 MPa, and thereby a compact was obtained.

The compact was subjected to primary heating, in a vacuum of 100 Pa or less, to 1,250° C. at a temperature rise rate of 5° C./min to 15° C./min. Subsequently, N$_2$ gas was introduced, and in a nitrogen atmosphere of 500 Pa, secondary heating was performed to 1,500° C. (sintering holding temperature) at a temperature rise rate of 5° C./min. By maintaining the temperature, sintering was performed. After maintaining the temperature for one hour, cooling was performed under different conditions, and two types of cermet substrates were obtained. In this test, two cooling conditions were used: (A) cooling in an Ar gas atmosphere of 200 kPa and (B) cooling in a CO gas atmosphere of 5,000 Pa. A cermet substrate obtained under the cooling condition A was defined as a cermet substrate A, and a cermet substrate obtained under the cooling condition B was defined as a cermet substrate B.

For each of the resulting cermet substrates, the hardness was measured by a micro-Vickers tester. Specifically, in a given cross section in the thickness direction of the cermet substrate, the average hardness in a region from the sintered surface of the surface of the substrate inward to a depth of 50 μm and the average hardness in a region in the depth range of 150 to 200 μm were obtained. In this test, a straight line was drawn from a given point of the surface of the substrate in the depth direction, and the Vickers hardness (Hv) was measured for three positions, in the same straight line, in each of a region from the surface to a depth of 50 μm and a region in the depth range of 150 to 200 μm, and such a measurement was performed for straight lines drawn from three different points of the surface of the substrate in the depth direction. The average value for each of the regions was defined as the average hardness (Hv). As a result, in the cermet substrate A, the average hardness in the region from the sintered surface to a depth of 50 μm was 19 GPa, and the average hardness in the region in the depth range of 150 to 200 μm from the sintered surface was 17 GPa. The hardness of the surface portion was about 11% higher than that of the interior portion. Furthermore, in the cermet substrate B, the average hardness in the region from the sintered surface to a depth of 50 μm and the average hardness in the region in the depth range of 150 to 200 μm from the sintered surface were each 17 GPa.

One cermet substrate A and ten cermet substrates B were prepared. Each of the cermet substrates was subjected to a blast treatment, using spherical (initial state) alumina (Al$_2$O$_3$) abrasive grains with an average particle size of 50 μm and a sphericity of 1.2 or less under the conditions shown in Table II. A wet blast treatment was performed on the surface of the cermet substrate from the rake face side to the flank face side. In Table II, the blasting angle refers to an angle inclined toward the edge side with respect to a direction perpendicular to the surface of the rake face, and is set by adjusting the inclination of the blasting nozzle.

After the blast treatment, an edge treatment was performed in which the edge of each cermet substrate was subjected to 0.04 mm R honing by medium honing. Furthermore, a finishing breaker was provided on the edge. Thus, cutting tools of Sample Nos. 1 to 11 were obtained.

For each of the resulting cutting tools, the average particle size of Al$_2$O$_3$ particles in the surface of the rake face and the elemental concentration of Al were measured. Specifically, the elemental concentration of Al was obtained by observing an area of 150 μm×150 μm in the surface of the take face, which had been subjected to the blast treatment, with a SEM, and performing quantitative analysis by EDX in the area. Furthermore, the average particle size of Al$_2$O$_3$ particles was obtained by measuring the longest diameter for each of all Al$_2$O$_3$ particles detected by EDX in the area, and calculating the average value thereof. The results are also shown in Table II.

TABLE II

| Sample (No.) | Substrate | Blasting angle (°) | Blast pressure (MPa) | Concentration (%) | Blasting time (sec) | Average particle size of Al$_2$O$_3$ particles (μm) | Elemental concentration of Al (at %) |
|---|---|---|---|---|---|---|---|
| 1 | B | 45 | 1.5 | 10 | 10 | 3.2 | 1.5 |
| 2 | A | 45 | 1.5 | 10 | 10 | 3.5 | 1.8 |
| 3 | A | 60 | 0.5 | 10 | 5 | 0.6 | 0.6 |
| 4 | A | 15 | 1.5 | 10 | 15 | 4.6 | 4.8 |
| 5 | A | 30 | 1.5 | 10 | 10 | 4.2 | 3.0 |
| 6 | A | 60 | 1.0 | 10 | 10 | 2.5 | 1.0 |
| 7 | A | 45 | 1.0 | 5 | 15 | 1.2 | 2.4 |
| 8 | A | 60 | 1.0 | 15 | 20 | 2.5 | 5.4 |
| 9 | A | 60 | 2.0 | 5 | 5 | 3.0 | 0.4 |
| 10 | A | 75 | 1.0 | 15 | 20 | 0.3 | 3.8 |
| 11 | A | 5 | 2.5 | 10 | 15 | 5.5 | 4.0 |

For each of the resulting cutting tools, a cutting test was performed under the conditions described below, and cutting performance (welding resistance and fracture resistance) was evaluated. The results thereof are shown in Table III.

(Cutting Conditions)
Workpiece: SCM415 (with four U-grooves)
Cutting speed: 100 m/min
Feed: 0.15 mm/rev
Depth of cut: 1.0 mm
Cutting state: wet type
(Evaluation Method)
The edge portion is observed after 30 minutes from the start of cutting, and the presence or absence of each of welding and chipping is confirmed by an optical microscope. Furthermore, the cutting time until the amount of flank wear (Vb) (excluding the edge treatment amount of 0.04 mm) reaches 0.10 mm or fracturing occurs is measured. In the case where the cutting time is less than 30 minutes, the presence or absence of each of welding and chipping at the end of cutting is confirmed.

TABLE III

| Sample (No.) | Presence or absence of welding | Presence or absence of chipping | Cutting time (min) | State at end of cutting |
|---|---|---|---|---|
| 1 | Absent | Absent | 35 | Wear |
| 2 | Absent | Absent | 62 | Wear |
| 3 | Small amount of welding | Absent | 48 | Wear |
| 4 | Absent | Absent | 42 | Wear |
| 5 | Absent | Absent | 45 | Wear |
| 6 | Absent | Absent | 58 | Wear |
| 7 | Absent | Absent | 68 | Wear |
| 8 | Absent | Absent | 17 | Wear |
| 9 | Large amount of welding | Present | 15 | Fracturing |
| 10 | Large amount of welding | Present | 22 | Fracturing |
| 11 | Absent | Present | 19 | Fracturing |

The results of Tables II and III show that, in Sample Nos. 1 to 7 in which $Al_2O_3$ particles with an average particle size of 0.5 μm or more and 5 μm or less are scattered over the surface of the substrate (rake face), and the elemental concentration of Al in the surface is 0.5 at % or more and 5 at % or less, welding is absent or the amount of welding is small even when welding is present, and chipping is absent. It is possible to perform cutting stably over a long period of time. Furthermore, comparison between Sample No. 1 including the cermet substrate B and Sample No. 2 including the cermet substrate A shows that the wear resistance is improved when the substrate (cermet substrate A) in which the hardness of the surface portion is 10% or more higher than the hardness of the interior portion is used. In particular, in Sample Nos. 2, 6, and 7 in which the average particle size of $Al_2O_3$ particles is 1 μm or more and 4 μm or less and the elemental concentration of Al is 1 at % or more and 2.5 at % or less, not only welding resistance and fracture resistance but also wear resistance is high in comparison with other Sample Nos. 3 to 5.

In contrast, in each of Sample Nos. 8 to 11, the cutting time is short. In Sample No. 8 in which the elemental concentration of Al in the surface of the rake face is high, although welding is absent, wear proceeds rapidly. In Sample No. 9 in which the elemental concentration of Al in the surface of the rake face is low, welding occurs and also chipping and fracturing occur. Furthermore, in Sample No. 10 in which the average particle size of $Al_2O_3$ particles is small, welding occurs and also chipping and fracturing occur. In Sample No. 11 in which the average particle size of $Al_2O_3$ particles is large, although welding does not occur, chipping and fracturing occur.

The embodiment described above can be changed appropriately without departing from the gist of the present invention, and is not limited to the structure described above. For example, the composition of the cermet, the average particle size of alumina particles, and the like can be changed appropriately.

INDUSTRIAL APPLICABILITY

The cutting tool of the present invention can be suitably used in the field of cutting.

The invention claimed is:

1. A cutting tool comprising a substrate composed of a cermet, wherein
the cermet includes a hard phase including compounds containing Ti, at least one metal other than Ti selected from groups 4, 5, and 6 of the periodic table, and at least one element of carbon and nitrogen, a binder phase including, as a main component, an iron group metal, and unavoidable impurities, wherein at least one type of particles selected from alumina particles and zirconia particles with an average particle size of 1 μm or more and 4 μm or less is scattered over a surface of a rake face of the substrate, and the concentration of at least one element of aluminum and zirconium in the surface is 1 at % or more and 2.5 at % or less.

2. The cutting tool according to claim 1, wherein the average hardness in a region from a sintered surface of the surface of the substrate to a depth of 50 μm is 10% or more higher than the average hardness in a region in the depth range of 150 to 200 μm from the sintered surface.

3. A cutting tool comprising a substrate composed of a cermet, wherein
the cermet includes a hard phase including compounds containing Ti, at least one metal other than Ti selected from groups 4, 5, and 6 of the periodic table, and at least one element of carbon and nitrogen, a binder phase including, as a main component, an iron group metal, and unavoidable impurities, wherein
at least one type of particles selected from alumina particles and zirconia particles with an average particle size of 0.5 μm or more and 5 μm or less is scattered over a surface of a rake face of the substrate, and the concentration of at least one element of aluminum and zirconium in the surface is 0.5 at % or more and 5 at % or less, and
the average hardness in a region from a sintered surface of the surface of the substrate to a depth of 50 μm is 10% or more higher than the average hardness in a region in the depth range of 150 to 200 μm from the sintered surface.

4. The cutting tool according to claim 3, wherein the average particle size of at least one type of particles selected from alumina particles and zirconia particles is 1 μm or more and 4 μm or less.

5. The cutting tool according to claim 3, wherein the concentration of at least one element of aluminum and zirconium is 1 at % or more and 2.5 at % or less.

* * * * *